H. E. PATRICK, A. J. PETERSON AND J. W. BERMES.
APPARATUS FOR USE IN ASSEMBLING, LIMBERING, AND TESTING GAS ENGINES.
APPLICATION FILED AUG. 8, 1918.
1,332,678.
Patented Mar. 2, 1920.
8 SHEETS—SHEET 1.
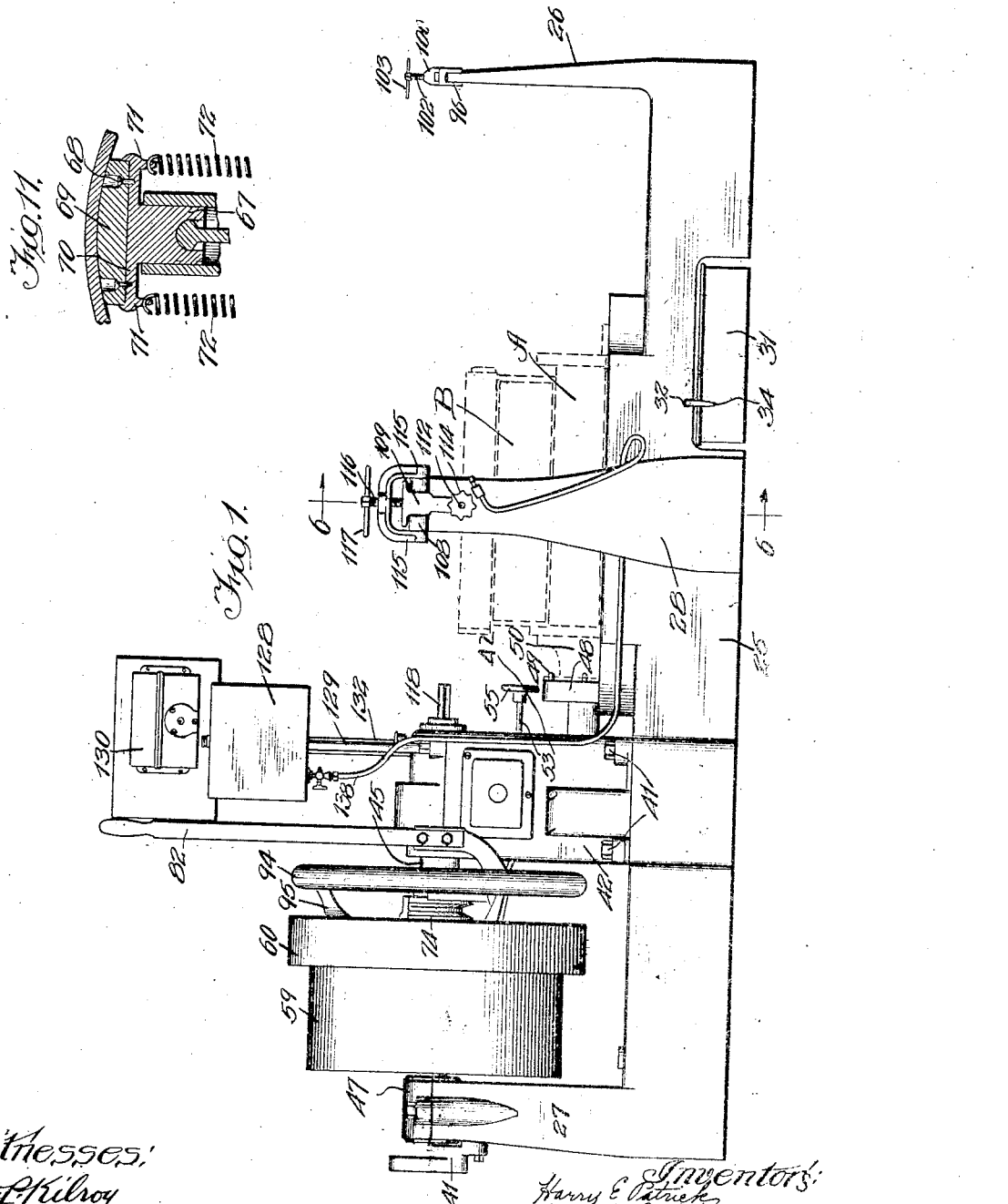

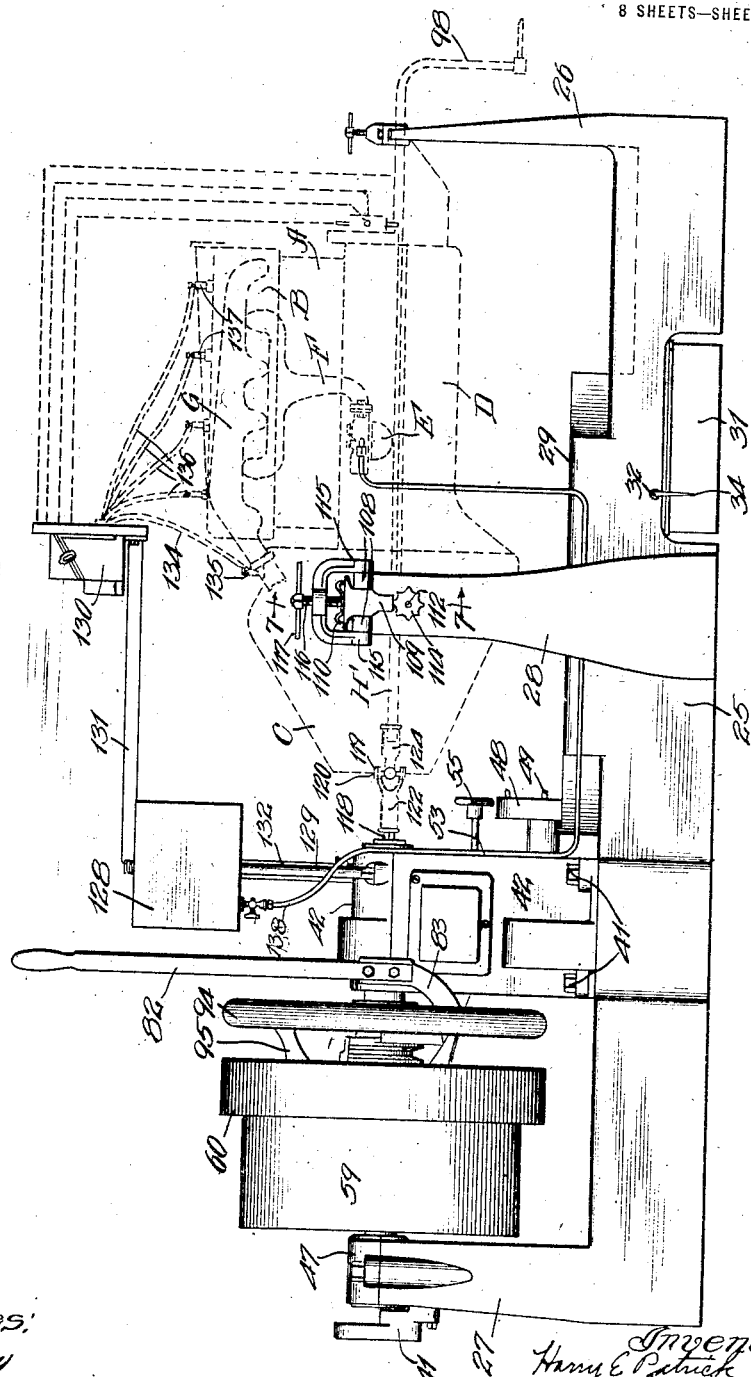

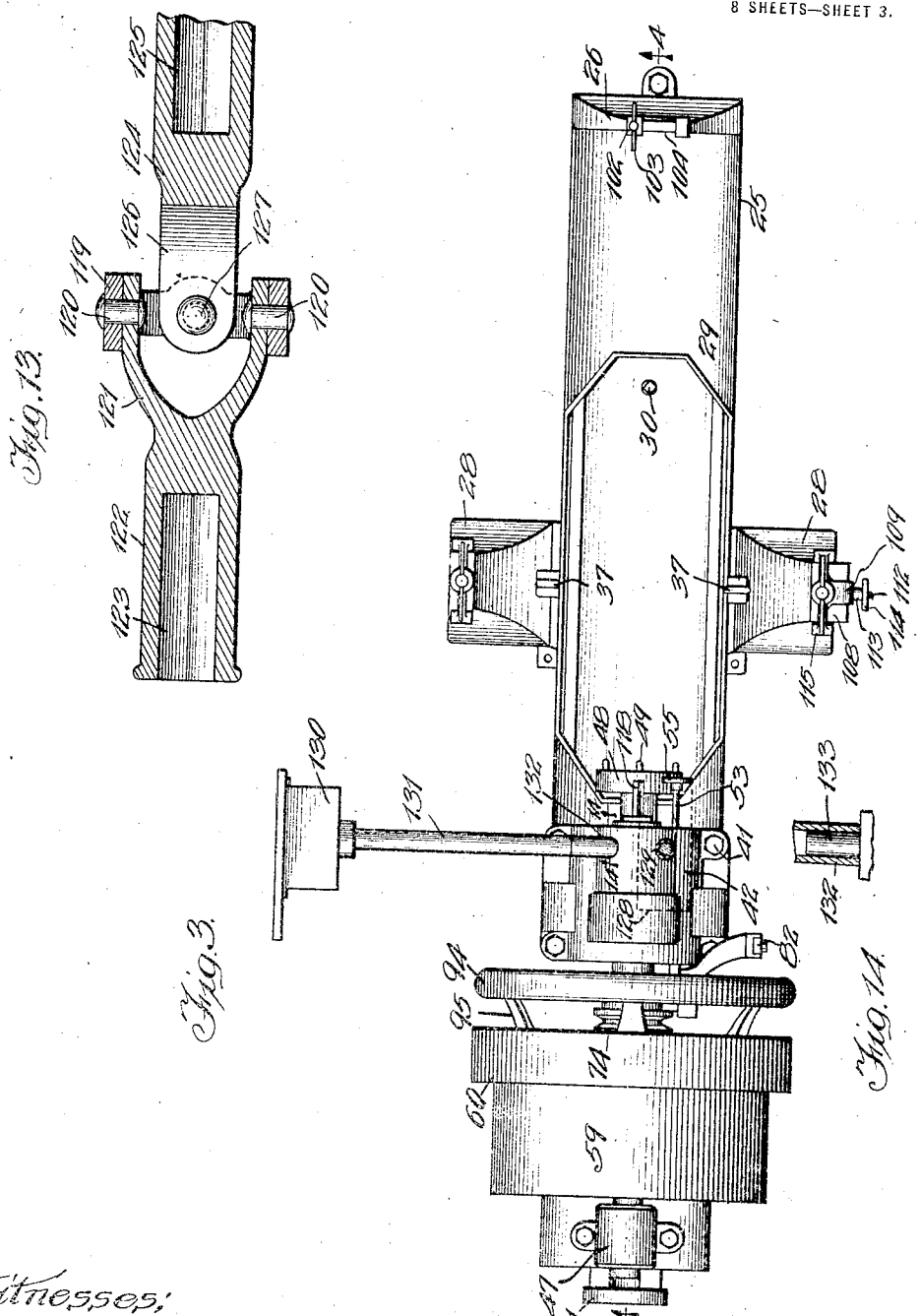

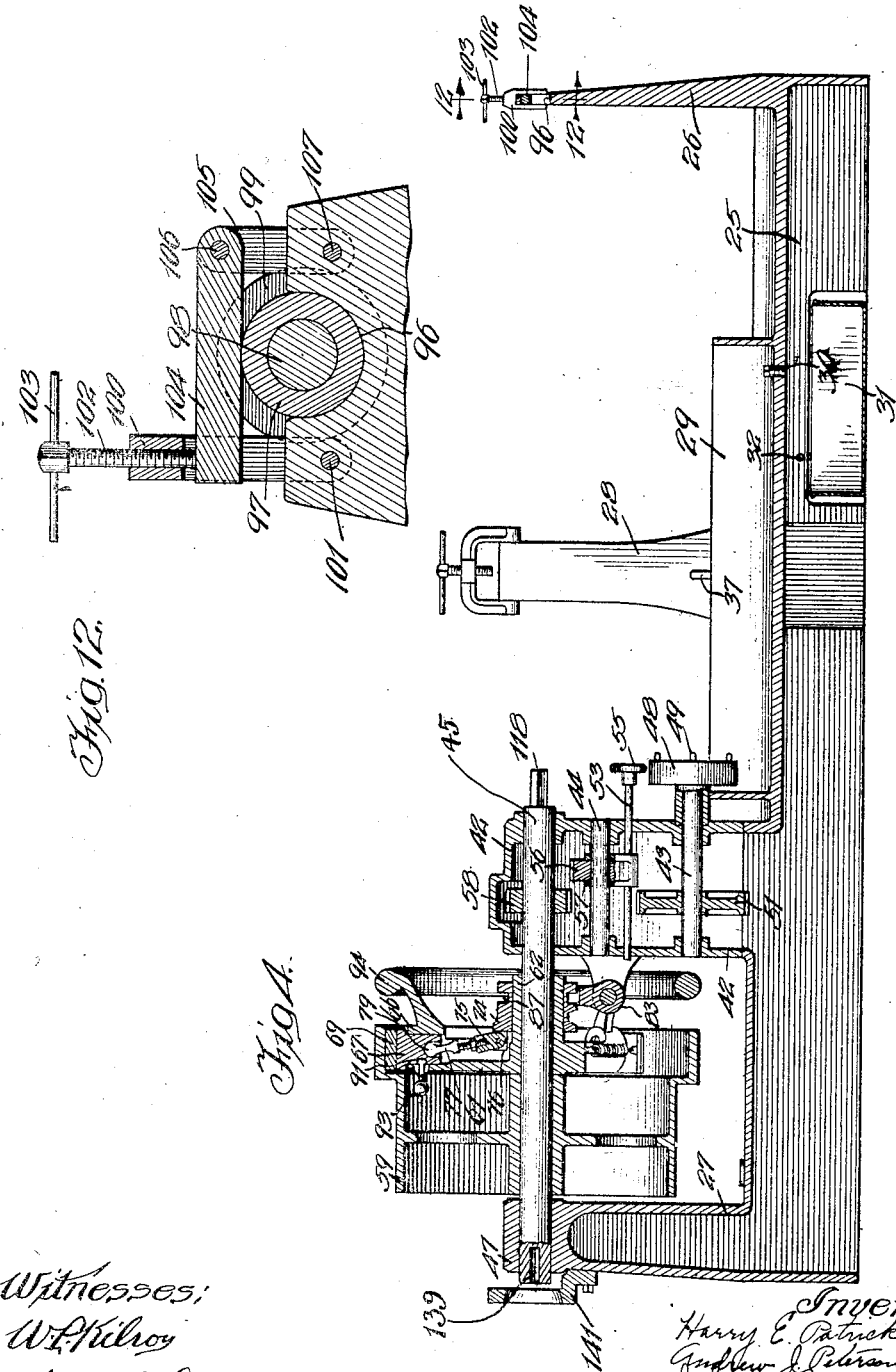

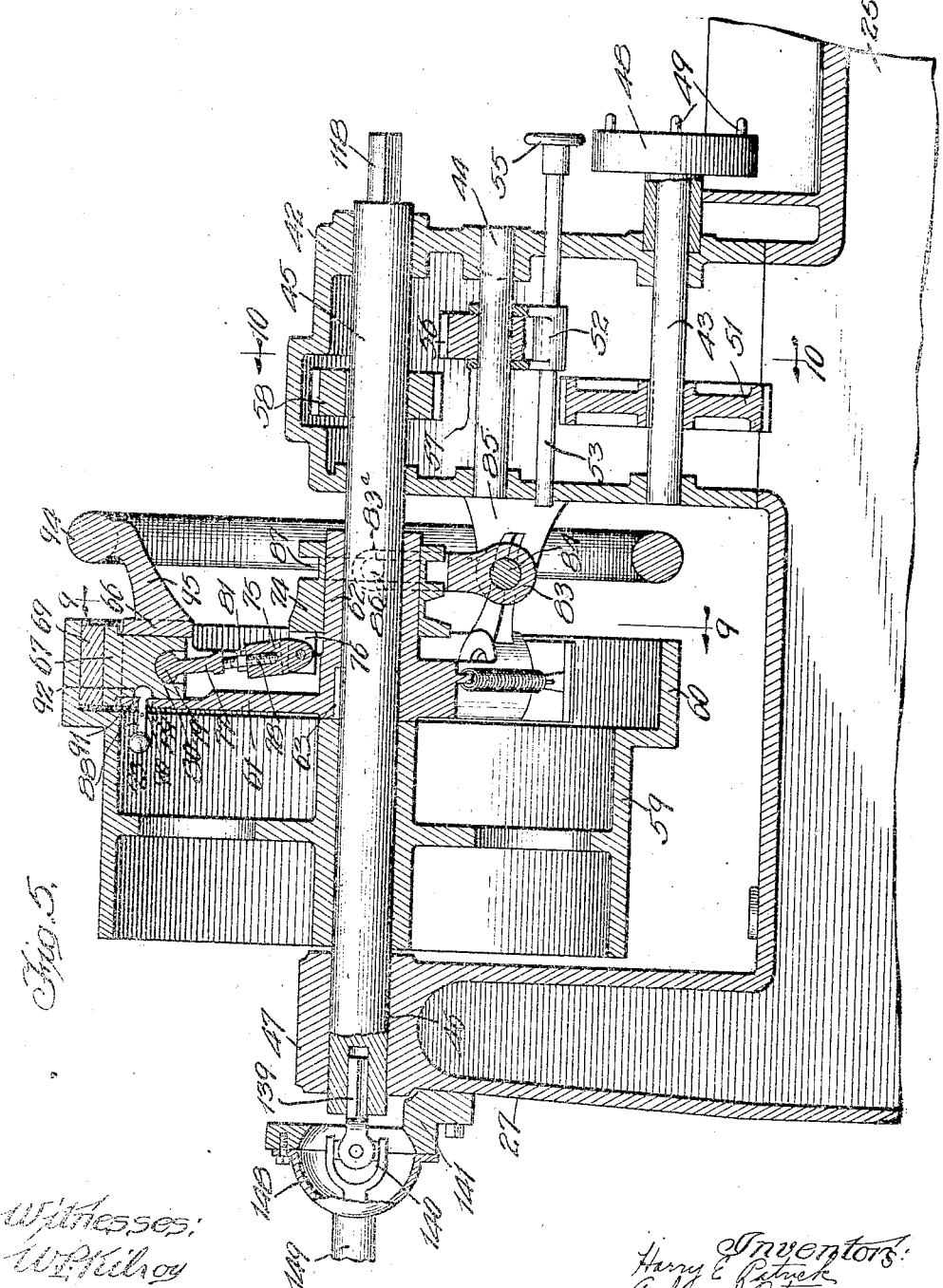

H. E. PATRICK, A. J. PETERSON AND J. W. BERMES.
APPARATUS FOR USE IN ASSEMBLING, LIMBERING, AND TESTING GAS ENGINES.
APPLICATION FILED AUG. 8, 1918.
1,332,678.
Patented Mar. 2, 1920.
8 SHEETS—SHEET 6.
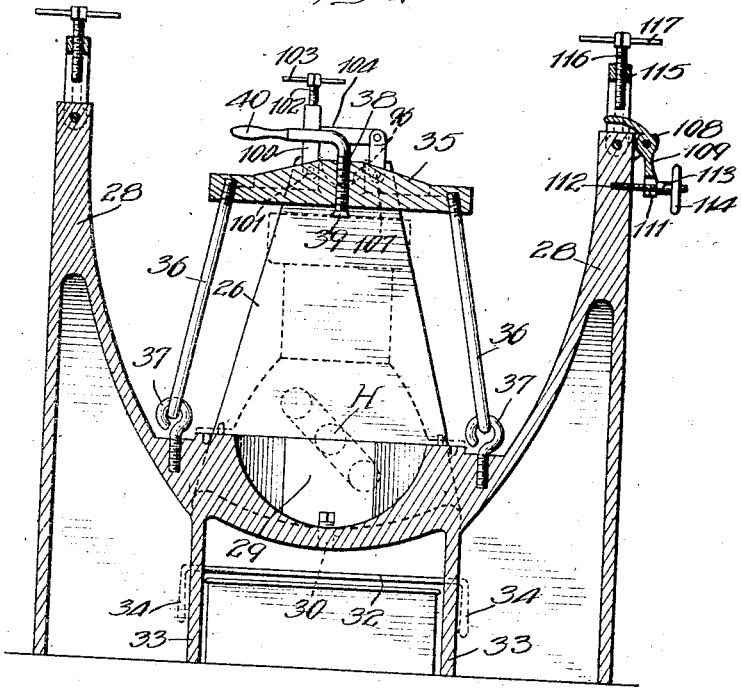
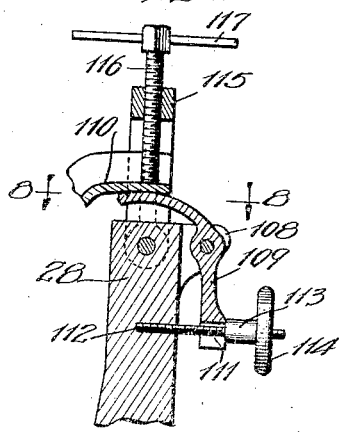
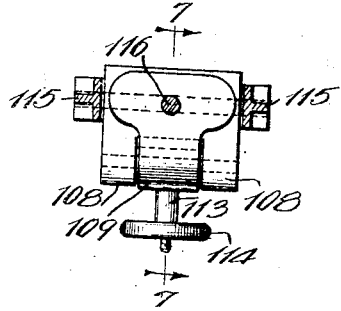

H. E. PATRICK, A. J. PETERSON AND J. W. BERMES.
APPARATUS FOR USE IN ASSEMBLING, LIMBERING, AND TESTING GAS ENGINES.
APPLICATION FILED AUG. 8, 1918.

1,332,678.

Patented Mar. 2, 1920.
8 SHEETS—SHEET 7.

Witnesses:
Inventors,

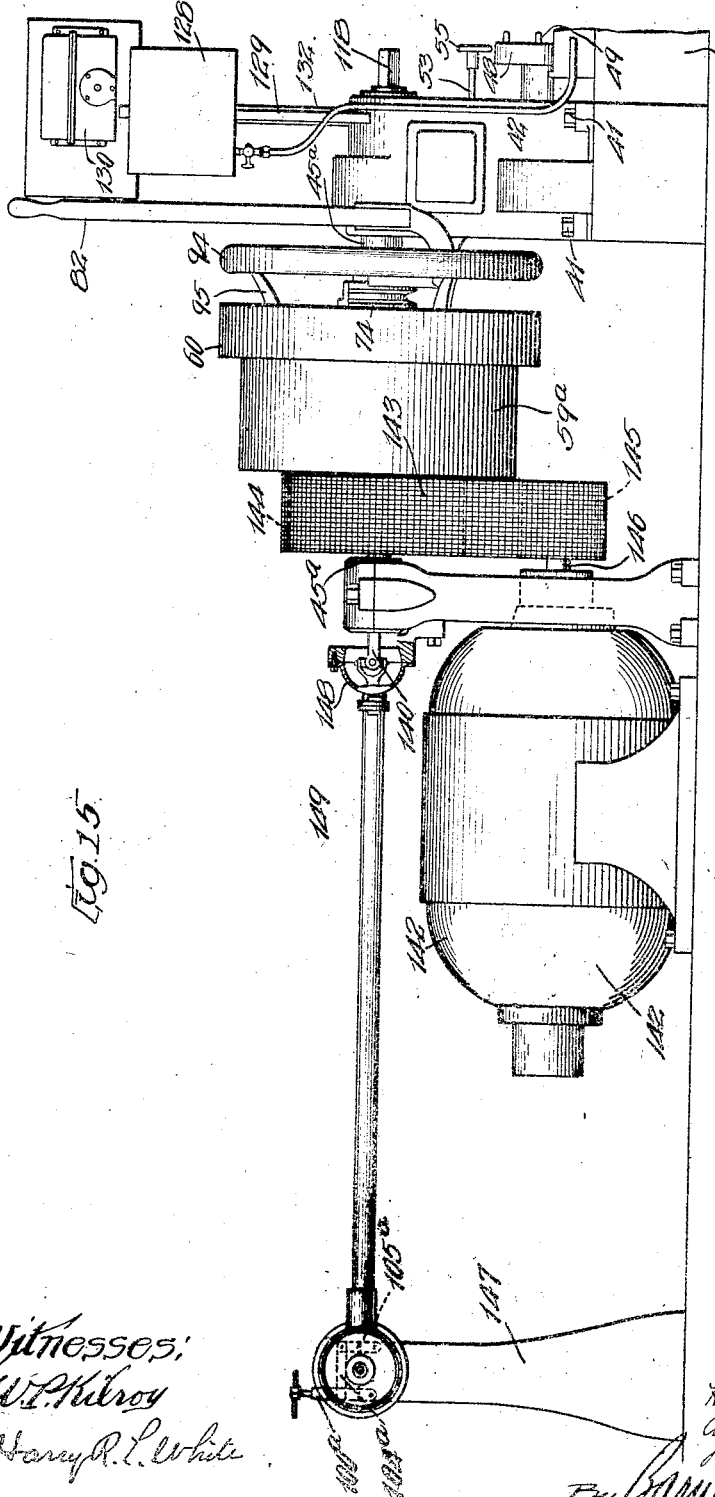

UNITED STATES PATENT OFFICE.

HARRY E. PATRICK, OF EVANSTON, AND ANDREW J. PETERSON AND JOHN W. BERMES, OF CHICAGO, ILLINOIS, ASSIGNORS TO SERVICE STATION EQUIPMENT COMPANY, A CORPORATION OF ILLINOIS.

APPARATUS FOR USE IN ASSEMBLING, LIMBERING, AND TESTING GAS-ENGINES.

1,332,678. Specification of Letters Patent. Patented Mar. 2, 1920.

Application filed August 8, 1918. Serial No. 249,036.

*To all whom it may concern:*

Be it known that we, HARRY E. PATRICK, residing at Evanston, and ANDREW J. PETERSON and JOHN W. BERMES, residing at Chicago, in the county of Cook and State of Illinois, citizens of the United States, have invented certain new and useful Improvements in Apparatus for Use in Assembling, Limbering, and Testing Gas-Engines, of which the following is a specification.

Our invention relates to an apparatus for use in service stations, automobile repair shops or gas engine manufacturing establishments in connection with the repair, assembling, limbering and testing of internal combustion motors; and the primary object of the invention is to provide an apparatus which will be relatively simple in construction and inexpensive to manufacture, by means of which certain operations, such as the burning in of bearings and the limbering up and testing of the motor may be accomplished either in the manufacture of new motors or in repair work, in such manner as to facilitate and expedite these operations and permit their being performed on one machine.

A further object of the invention is to provide an apparatus of this sort which will be relatively small and compact in structure and at the same time strongly and rigidly built, and to arrange the parts of the apparatus so that the several operations concerned may be performed as expeditiously as possible. The practical value of these characteristics in an apparatus of this kind will be apparent when it is considered that these apparatuses are intended, more particularly, for use in automobile service stations, repair shops or garages which are apt to be overcrowded, and that the vibration to which such an apparatus is subjected because of the speed at which the motors are run when supported thereon is so considerable as to put the parts of the apparatus to very severe strain.

We have shown in the drawings and will describe in this specification a form of apparatus intended especially for the Ford motor but it will be understood that inasmuch as it would be within the province of the ordinary mechanic to modify the construction for motors of other types, the invention is not to be considered as limited to the construction suitable for Ford service. It will also be realized that the apparatus might be modified in certain other details of construction without departure from the principles of the invention as defined by the claims appended hereto.

In the accompanying drawings

Figure 1 is a side elevation of a preferred embodiment of the invention showing the motor structure in the place which it occupies during the operation of burning in the crank shaft and connecting rod bearings.

Fig. 2 is a similar view showing the motor structure in a further stage of assembly supported in position to limber up the bearings.

Fig. 3 is a plan view of the apparatus with the motor structure removed.

Fig. 4 is a longitudinal sectional view of the same, being a section on line 4—4 of Fig. 3.

Fig. 5 is an enlarged longitudinal sectional view through the apparatus for revolving the crank shaft of the motor in the operation above set forth.

Fig. 6 is a sectional view on line 6—6 of Fig. 1.

Fig. 7 is a sectional view, on an enlarged scale, on line 7—7 of Fig. 8.

Fig. 8 is a sectional view on line 8—8 of Fig. 7.

Fig. 11 is a detail sectional view to illustrate the construction of a certain portion of the clutch.

Fig. 12 is a sectional view on line 12—12 of Fig. 4.

Fig. 13 is a sectional view of the universal joint employed for connecting the crank shaft of the motor, in the limbering position of the motor, with the shaft by which the crank shaft is rotated.

Figure 9:
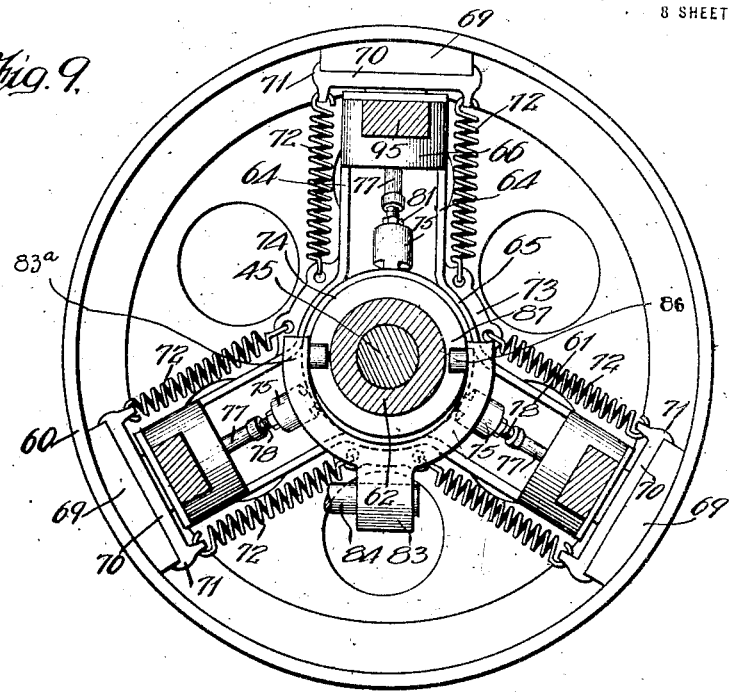
Fig. 9 is a sectional view on line 9—9 of Fig. 5 to show the construction of the clutch employed for connecting the driving mechanism of the apparatus with the belt pulley by which power is supplied.

Fig. 14 is a detail view showing the connection between the distributer support and the gear case of the apparatus, which connection permits the distributer to be swung back and forth in different positions, and Fig. 15 is a view, in elevation, of the driving end of the apparatus, showing a modified form of driving connection and illustrating the manner in which the propeller shaft of an automobile is connected to the apparatus.

Like characters of reference designate like parts in the several figures of the drawings.

When a gasolene motor has been taken down and its bearings rebabbitted it is desirable to burn in the bearings by running the motor without lubrication at a relatively low speed, for example, at from one hundred to two hundred and fifty revolutions per minute. The bearings are then lubricated and the crank shaft again revolved and the work tested. These operations are performed, in the apparatus of our invention, while the motor assembly, consisting of crank case A and cylinder block B, is in the position indicated by the dotted lines in Fig. 1 of the drawings, the lower section of the crank case not having been as yet assembled. After this operation is accomplished, the motor structure is further assembled by adding the transmission case C and the lower section D of the crank case, as shown in Fig. 2, together with a carbureter E, inlet manifold F and exhaust manifold G, and the structure so assembled is placed on the apparatus in the position indicated in Fig. 2 and the bearings limbered up and tested, as will be hereinafter described.

The apparatus comprises, preferably, a base member 25 formed at one end with an upright support 26 for the motor assembly, at the other end with an upright support 27 for one end of the main shaft of the apparatus, and with supports 28, 28 at opposite sides of the base for the suspension lugs on the motor casing, these elements being preferably cast in one integral structure, the advantage of which is that the apparatus is made very rigid and strong to withstand the vibration due to the high speed at which the motor is run. The base 25 is formed with a recess 29 to give clearance for the crank shaft during the burning in operation and to hold oil for the subsequent operation, the base being preferably formed with an outlet 30 for draining the oil from the basin or recess 29, a pan 31 being arranged under this portion of the base and held against accidental displacement preferably by means of a rod 32 pivoted in the vertical webs 33 of the base, the ends of the rod being turned down, as indicated at 34 (Figs. 1, 2 and 6). The motor structure, consisting of the upper section A of the crank casing and the cylinder block B, is positioned on the base with the crank shaft H (Fig. 6) over the basin 29. The motor structure is clamped, preferably, to the base by means of a cross piece 35 which extends across the cylinder block and links 36 adapted to engage eyes 37 fixed to the base on opposite sides of basin 29, the cross piece being provided with a set screw 38 which is threaded through the cross piece and has a swiveled foot 39 adapted to bear against the top of the cylinder block, the set screw being provided with a handle 40 by which the screw may be turned down so as to exert clamping pressure against the motor structure.

Secured to the standard by bolts 41 is a gear casing 42 provided with bearings for shafts 43, 44, 45, the latter of which is supported at its outer end on the support 27 above referred to, which is formed at its upper end with a suitable bearing groove 46 for the shaft and provided with a retaining boxing 47. The shaft 43 has rigid therewith a disk 48 provided with pins 49 for engaging the element 50 (Fig. 1) on one end of the crank shaft of the motor. A gear wheel 51 is secured to the shaft 43 within the housing 42 and is adapted to mesh with a shift gear 56 slidably mounted upon a stationary shaft 44. This shift gear is operated by the manipulation of a slide rod 53 equipped with a handle or knob 55 where it protrudes from the casing 42. Thus there is secured to said rod a boss 52 with a pair of arms 57 embracing the gear 56 and the shaft 44. A gear wheel 58 is secured upon the shaft 45 within the casing 42 in vertical alinement with the aforesaid gear wheel 51. The latter gear wheel is of larger diameter than the gear wheels 56 and 58 so that the speed of the shaft 43 will be less than that of the shaft 45. When the shaft 43 is in use the shift gear 56 will be in mesh with the gear wheels 51 and 58, this being brought about by simply pushing in the knob 55. When, on the other hand, the shaft 45 is in use it is preferable to unmesh the gears by pulling the knob out as illustrated in Fig. 4 so as to avoid unnecessarily running the gears 56 and 51 and the shaft 43.

Loose on shaft 45 is a belt pulley 59 having associated therewith, preferably cast integrally thereon, an annular part 60 forming one member of a clutch, the other member of which comprises a disk 61 having a hub 62 keyed at 63 to shaft 45. The hub is formed with three pairs of webs 64 connected by arcuate webs 65, each pair of webs being connected at their outer ends by a web 66 forming with the two webs 64 a housing for a plunger 67 which has attached thereto by screws 68 (Fig. 11) a wooden clutch block 69 adapted to bear against the inner surface of clutch member 60. The blocks 69 are seated in cap pieces 70 formed on the outer ends of the plungers 67. The cap pieces are formed at each side with perforated lugs 71 for the coiled springs 72, the opposite ends of which are fastened to flanges 73 formed on the arcuate webs 65 just mentioned. A sleeve 74 is slidably arranged on hub 62 and a strut is provided between the sleeve and each plunger 67 consisting of a member 75 pivoted to the sleeve in a recess 76 formed therein and a member 77, one end 78 of which has a threaded engagement with member 75, the other end of which is formed with a rounded head 79 which extends into a socket 80 in the plunger 67, the threaded portion 78 of member 77 having a lock nut 81 thereon for locking the two members in proper adjusted position. The sleeve 74 is moved back and forth on hub 62 by means of a lever 82 connected with a rocking member 83 pivoted at 84 to a bracket 85 on the gear case 42, the rocking member being formed with a forked portion 83ª having blocks 86 which extend into the circular groove 87 formed in the sleeve. In order to counterbalance the centrifugal force of the plungers 67 which at high speed will tend to throw the plungers outwardly so as to drive the clutch blocks 69 against the clutch member 60 with such force as to make the release of the clutch difficult, we preferably provide centrifugal counterbalancing devices, one associated with each of the plungers. The device consists of a lever 88 pivoted to a lug 89 formed on the disk 61, the disk being slotted at 90 to allow the inner end of the lever, which has the rounded head 91, to engage a recess 92 formed in the plunger. The outer end of the lever carries a weight 93. A hand wheel 94 is connected with the clutch member 61. This hand wheel consists of a ring having arms 95 cast integrally therewith and with the webs 66. The purpose of the hand wheel is for convenience in rotating the motor shaft, when the parts of the clutch are in position to disengage shaft 45 and the train of gears associated therewith from the belt pulley whereby the condition of the bearings may be tested after having been burned in, with the motor assembly in the position shown in Fig. 1, or during the limbering operation of the motor with the parts of the motor as shown in Fig. 2.

For the limbering operation the motor is placed on supports 26 and 28. The support 26 is formed at its upper end with a groove 96 (Fig. 12) to receive the boss or circular projection 97 on the forward end of the crank case in which is arranged the end of the crank 98 used for starting the engine, the boss 97 being formed with a flange 99 which overlaps the outside of the support 26. A forked member or yoke 100, pivoted at 101 to support 26, is provided with a screw 102 having a handle 103, the screw being threaded through the upper part of said yoke and adapted to bear on a member 104, the other end of which is connected to the support by links 105 pivoted at 106 to the member 104 and at 107 to the support. The member 104 bears upon the boss 97 so that by the arrangements just described the forward end of the crank casing is clamped firmly to support 26.

Each of the side supports 28 is formed at the upper end with a pair of spaced lugs 108 between which is pivoted a rocking member 109 on the upper end of which rests one of the suspension lugs on the motor crank case by means of which the motor is supported on the chassis of the automobile, the lug being designated 110 in the drawings. (Figs. 2 and 7). The lower end of the rocking member 109 is formed with a perforation 111 through which extends a screw 112 fixed in the support 28 and carrying at its outer end an adjusting nut 113 having a hand grip 114 by means of which the angular position of the rocking member 109 may be varied so as to adjust the vertical position of the suspension lug. The adjustment, as just described, of the rear end of the motor casing is desirable in order to properly aline the crank shaft of the motor with shaft 45 of the apparatus by means of which the crank shaft is driven when the motor assembly is in limbering position. Pivoted to each of the supports 28 is a yoke 115 through which is threaded a screw 116 having a handle 117, the screw being adapted to bear against the upper side of lug 110 and clamp the same against the rocking member 109.

The end of shaft 45 is square in cross section, as shown at 118, and is connected with the transmission drive shaft H' of the motor preferably by means of a universal joint, such as that shown in Figs. 2 and 13. This device consists of a ring 119 to which is pivoted by rivets 120, the forked ends 121 of a member 122, the latter being formed with a socket 123 for the squared end 118 of shaft 45, the joint consisting further of a member, designated 124, similar to member 122 provided with a socket 125 for engagement with the end of the transmission drive shaft, the other end of this member being forked at 126 and pivoted by rivets 127 to the ring 119.

In order that the motor may run under its own power as soon as sufficiently limbered up to do so, our apparatus is provided with a gasolene tank 128 which is arranged on a support 129 connected with the gear case 42 and with an electrical distributer 130 arranged on the horizontal arm 131 of a support 132 which is hollow, consisting preferably of a piece of pipe, and extends over a stud 133 formed on the gear case 42, this arrangement permitting the distributer to be moved either to a position over the motor, when the motor is being limbered up, or back to a position out of the way when the bearings are being burned in. For example, coil box 130 is provided with a wire 134 running to the magneto terminal 135 of the motor and wires 136 running to the several spark plugs 137 of the motor and also wires running to the commutator. Associated with the gasolene tank 128 is a pipe 138 which may be connected with the carbureter E of the motor.

The end of shaft 45 opposite the squared portion 118 is provided with a square socket 139 for connection with the universal joint 140 of an automobile propeller shaft so that the apparatus may be employed, if desired, for working in the differential gears of the car or complete rear axle. To this end the support 27 is provided with a bracket 141 to engage the housing of the propeller shaft. The operation with which this feature of the machine is concerned will be described more fully in connection with the modified form of apparatus which is shown in Fig. 15 of the drawings.

Figure 10:
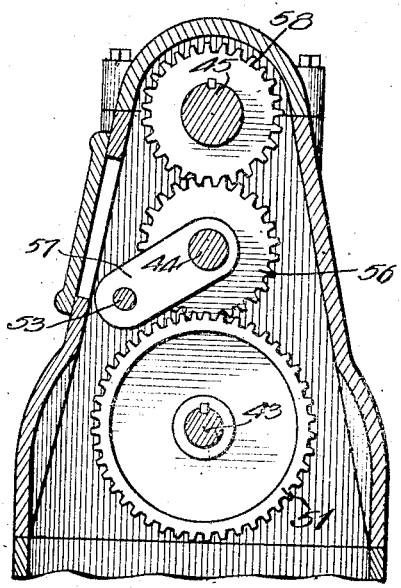
Fig. 10 is a sectional view on line 10—10 of Fig. 5.

In Fig. 15 we have shown a modification in which the apparatus is driven by a variable speed motor 142. The motor is connected to the main shaft 45ª by means of a silent chain 143 of the usual construction, which extends over a sprocket 144 on the hub of the pulley 59ª and a sprocket 145 on the motor shaft 146. This arrangement permits the speed of the apparatus to be gradually increased or reduced as may be desired when performing certain operations. This arrangement is also very advantageous in small service stations or repair shops, as the motor 142 may furnish the power for operating other machines without operating this burning in apparatus, the power being transmitted to such other machines by a belt fitted on the pulley 59ª which is loosely mounted on the shaft 45ª. In other respects this apparatus may be the same as that shown in Figs. 1 to 14, inclusive. The use of a variable speed motor presents certain other advantages which are not readily obtainable with a driving connection which rotates the main shaft at a fixed speed, in that it makes it possible to run in the differential gears and the rear axle of an automobile at a higher speed than is necessary or desirable for operating the crank shaft of the internal combustion motor during the burning in or limbering operation. In this embodiment we have shown a rear axle assembly clamped on upright supports 147 by means of a screw clamp 100ª and pivoted links 104ª, 105ª which are substantially the same as the clamping device shown in Fig. 12. The semi-spherical enlargement 148 of the propeller shaft housing 149 is bolted to the bracket 141. The propeller shaft is operatively connected to the main shaft 45ª of the apparatus by means of the universal joint connection 140.

We claim:

1. An apparatus of the character described comprising a suitable base with an oil trough and provisions for receiving an engine block with lower half of crank case off, means for clamping said block to said trough so that the crank shaft may dip into the oil therein, a head rising from the base adjacent the trough, and driving means carried by said head and including a power shaft adapted to aline with and be rotatably coupled to the crank shaft when the engine block is clamped to the trough.

2. An apparatus of the character described comprising a suitable base member adapted to receive an engine block with the lower half of its crank case off, a cross-piece to extend over said block, and connections between the opposite ends of said cross-piece and the base with provisions for clamping the block to the latter; together with driving means assembled with the base and including a power shaft adapted to aline with and be rotatively coupled to the crank-shaft when the engine block is clamped upon the base member.

3. In apparatus of the character described, the combination of a base having a recess, engaging means for positioning the crank case and cylinders of a motor on said base with the lower section of the crank case removed and the crank shaft over said recess, said means comprising a cross piece to extend over the motor structure, links engageable with the cross piece and the base and the clamping device on the cross piece to bear against the motor structure, and means engageable with said crank shaft for rotating the same.

4. In apparatus of the character described the combination of a base member with provisions for holding an engine block, means for clamping the latter to said base member, side uprights flanking said base member and an end upright with provisions for sustaining a complete engine assembly between said uprights and over the base member; together with driving means applicable either to run the crank shaft with the engine block clamped to the base, and with the complete engine assembly sustained by the uprights.

5. The apparatus of claim 4, the base member being recessed to serve as an oil trough and the flanking uprights rising from the sides of the trough.

6. The apparatus of claim 4 the clamping means employed for the burning-in process comprising a cross-bar accommodated between the flanking uprights and links detachably anchored to the base, together with a clamping appliance.

7. Apparatus of the character described comprising a base and uprights over which the suspension lugs of the engine block may extend, and yokes pivoted to the uprights so as to swing down clearing the way for the placing on of the block, and set screws in the yokes for clamping the suspension lugs when the yokes are swung up over the same.

8. In apparatus of the character described, an adjustable clamp for application to the suspension lug of an engine block said clamp comprising a pivoted under member on which the suspension lug is received, an adjustable stop opposing movement of said pivoted member responsive to the weight of the engine, and an upper clamp member to bear upon the suspension lug.

9. The clamping mechanism of claim 8 the upper clamp member being carried by a swinging support.

10. In apparatus of the character described, the combination of a base having upwardly projecting supports for the suspension lugs on the sides of the casing of a motor, a support for one end of the casing, a revoluble element engageable with the crank shaft of the motor, a yoke pivoted to each side support having a set screw to bear upon the upper side of the suspension lug, a locking member on the support on which said lug rests, and an adjusting screw for changing the angular position of the locking member to raise and lower the lug.

11. In apparatus of the class described, a base and an end upright with a seat for the starting crank boss of an engine block, a clamp-piece to swing over said boss, links connecting said piece to the upright, and a yoke pivoted to the upright and carrying a set screw to bear upon the clamp piece when the yoke is swung over the same.

12. In apparatus of the character described, a base and head, the base adapted to receive and hold either an inverted engine block or a complete engine assembly; a power shaft in the head; a countershaft; and change speed gearing connecting them, each shaft being equipped for coupling it to the engine crank-shaft whereby the latter may be driven at slow speed for burning-in or at high speed for limbering.

13. In apparatus of the character described, a main frame comprising a head and a base and support for an inverted engine block and uprights between which a complete engine assembly is receivable and by which such assembly will be supported; a power shaft in the head; a countershaft; and change speed gearing connecting them, each shaft being equipped at one of its ends for alined-coupling with the engine crank whereby the latter may be driven at slow speed for burning-in or at high speed for limbering.

14. Apparatus of claim 12 with provisions for disconnecting the two shafts at will.

15. In apparatus of the character described a base and means for clamping an engine block upon the same, and driving mechanism including a shaft with provisions for coupling it to the engine crankshaft in alinement therewith and a clutch for throwing power on and off, the driven member of said clutch having an annular hand-turning attachment.

16. The apparatus of claim 14 the clutch comprising a driving annulus and a spoked driven member whose spokes have rigid lateral arms carrying an annular handturning member.

17. In apparatus of the character described, the combination of a base formed with a recess, supports at the sides and one end of the base for sustaining a motor structure, means for engaging the crank case and cylinders of the motor to the base with the bottom section of the crank case removed and the crank shaft over said recess, supporting means at the other end of the base from the first named end support, upper and lower shafts having bearings in said supporting means, said shafts being provided with means for engaging the crank shaft of the motor in respectively the positions just mentioned, driving means for one of said shafts, a disengageable power transmission connection between said shafts, and a clutch interposed between the driving mechanism and the shaft driven thereby comprising two engageable elements, one associated with the driving mechanism and the other with the shaft, the latter being formed with a hand wheel, for the purpose described.

18. In apparatus of the character described, a base and uprights and clamping means to receive and hold an engine assembly; a head and driving mechanism therein including a power shaft; and a universal drive-coupling with socketing members to engage said power shaft and a transmission shaft of the engine respectively.

19. In apparatus of the class described, a base and uprights and clamping devices for holding an engine and transmission assembly; and a coil-box support mounted upon the frame work with provision for swinging it horizontally into and out of working position.

20. Apparatus of the character described comprising a machine head with power delivering shaft equipped at one end for connection with the crank shaft or transmission shaft of an engine and socketed at the other end to receive the universal joint connection of the propeller shaft; and suitable frame work for supporting an engine at one side of the machine head, or a propeller shaft and differential rear axle assembly at the other side thereof.

21. Apparatus of claim 19, the machine head having a bracket with provisions for bolting thereto the semi-spherical casing of the universal joint.

22. Apparatus of the character described comprising a machine head with a power delivering shaft and a clutch; a variable speed motor belted to the driving member of the clutch; and a supporting frame work for holding automobile driving mechanism with its shaft or shafts in alinement with the power shaft of said machine stand; together with provisions for rotatively coupling and uncoupling the same.

HARRY E. PATRICK.
ANDREW J. PETERSON.
JOHN W. BERMES.